Nov. 23, 1965   E. BARKER   3,218,669
BLOW-MOLDING APPARATUS
Filed Nov. 1, 1961   14 Sheets-Sheet 1
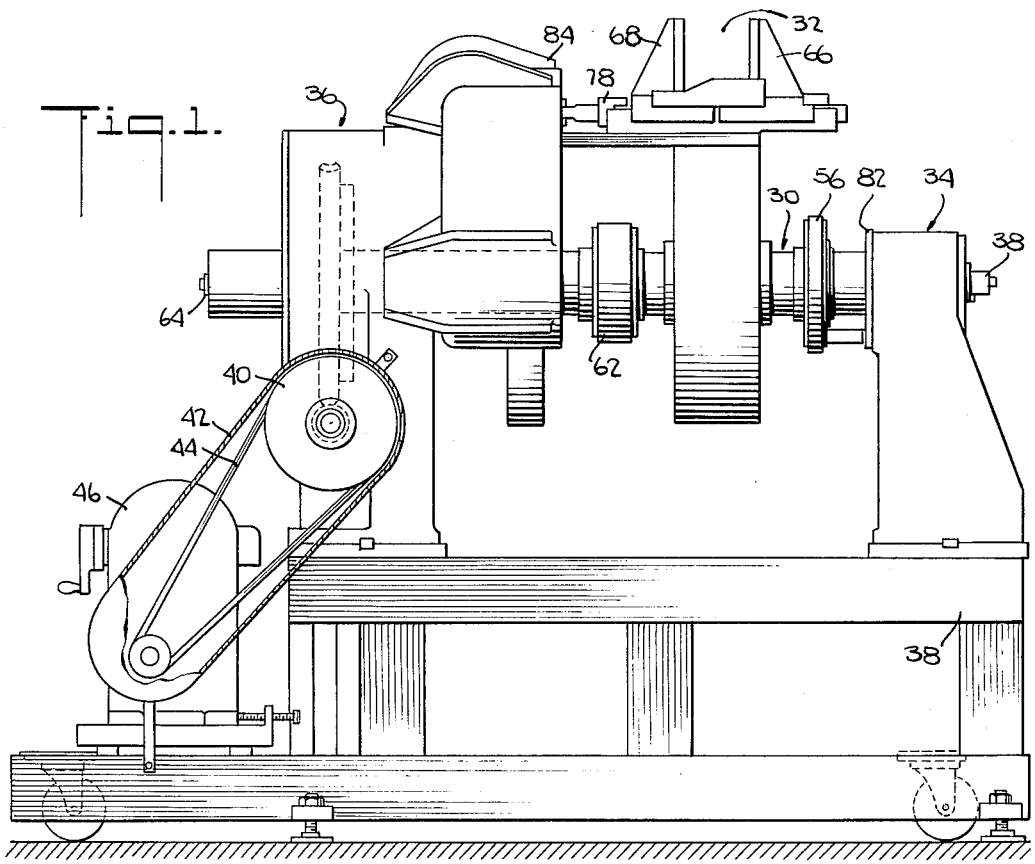
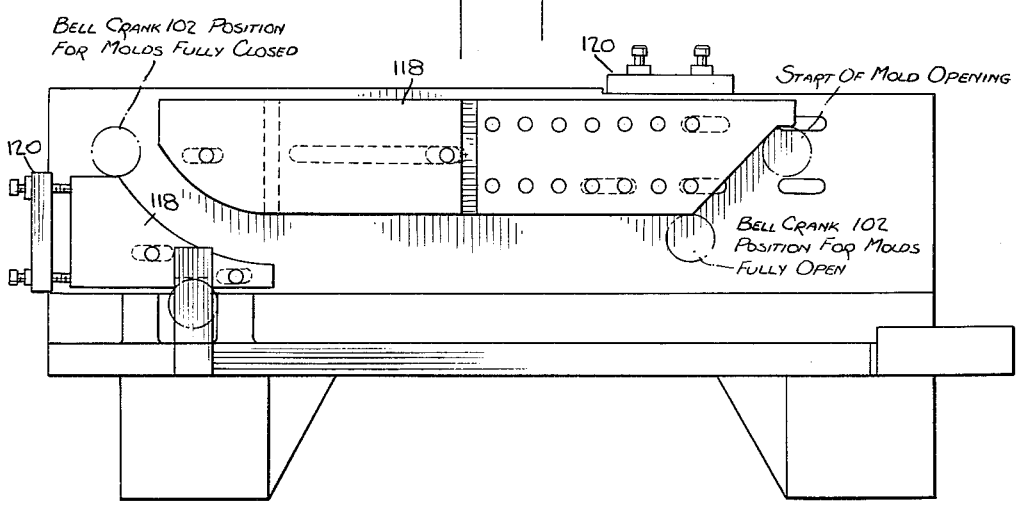

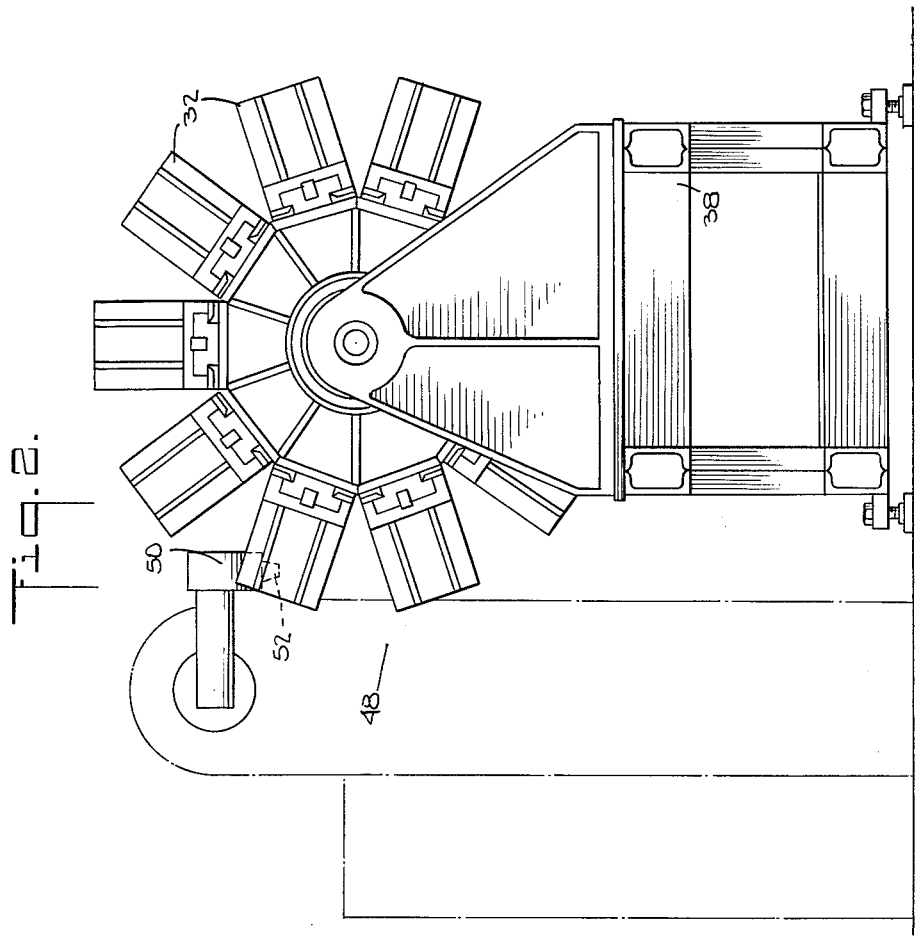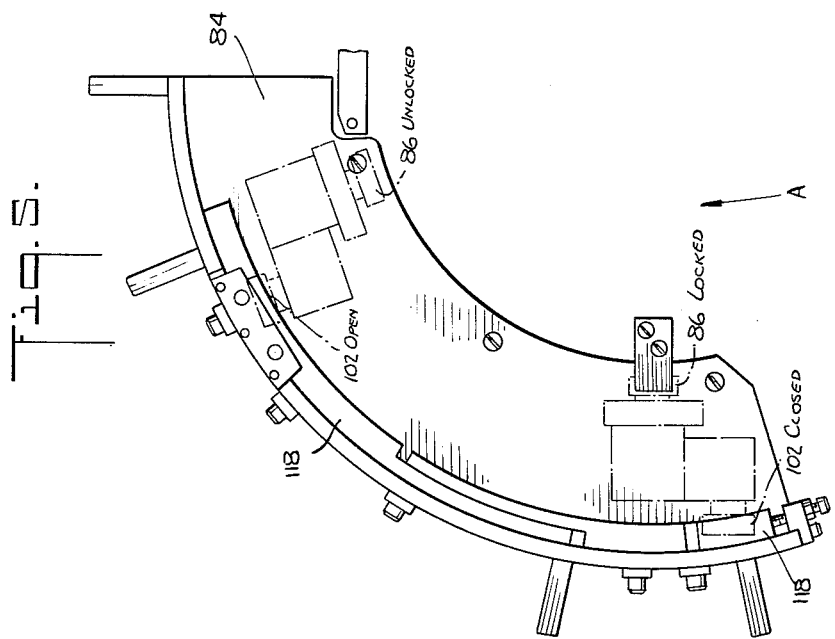

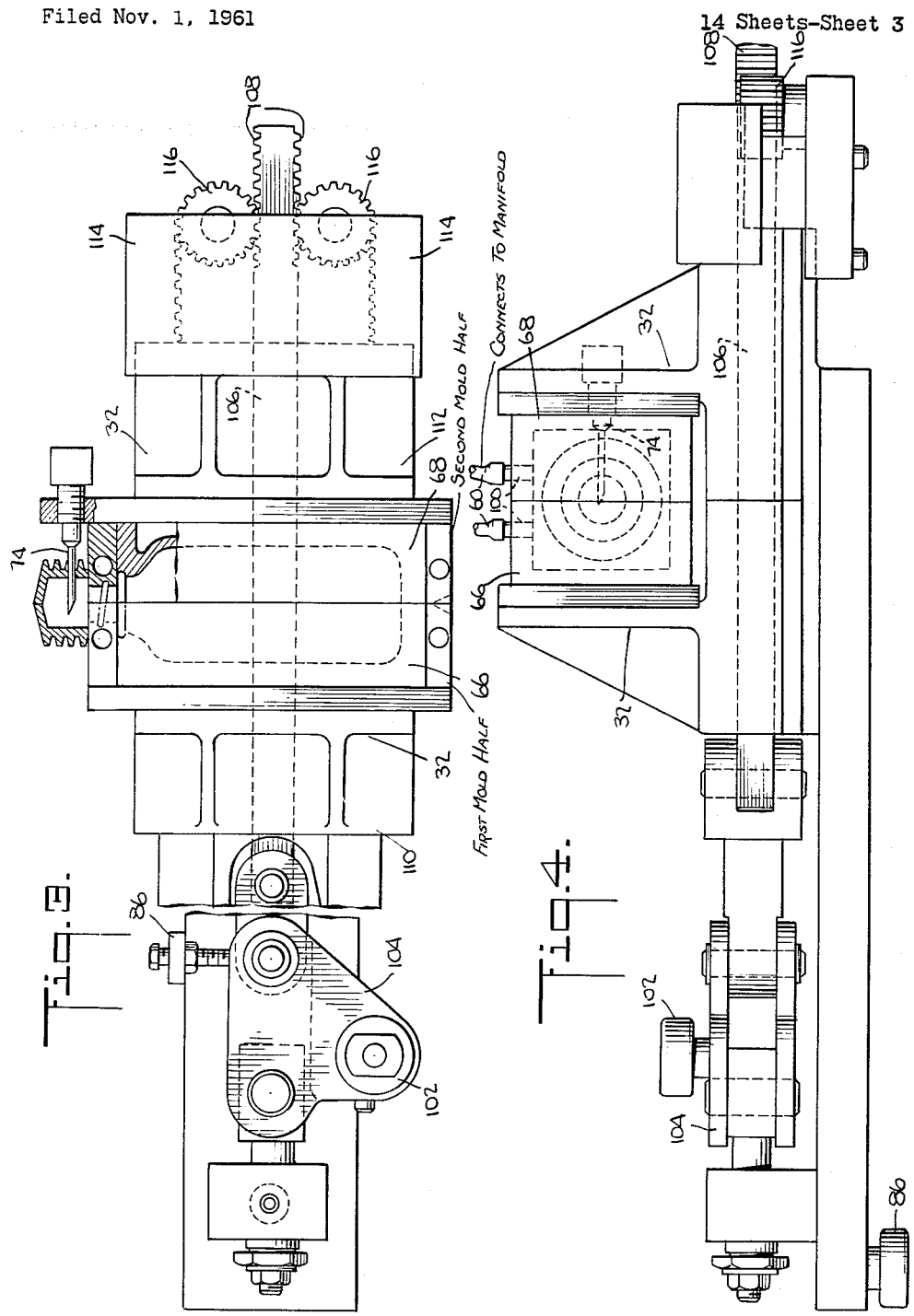

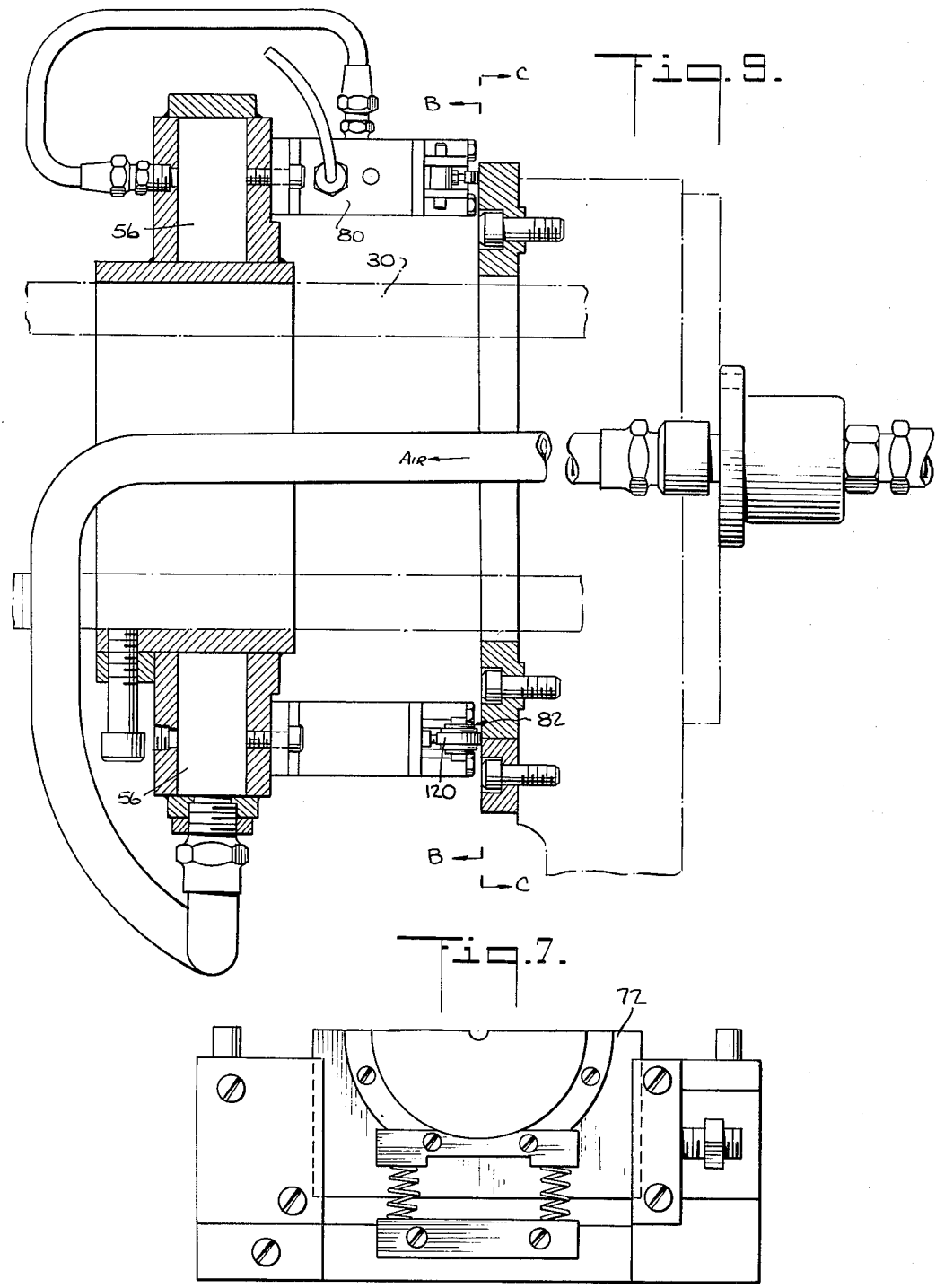

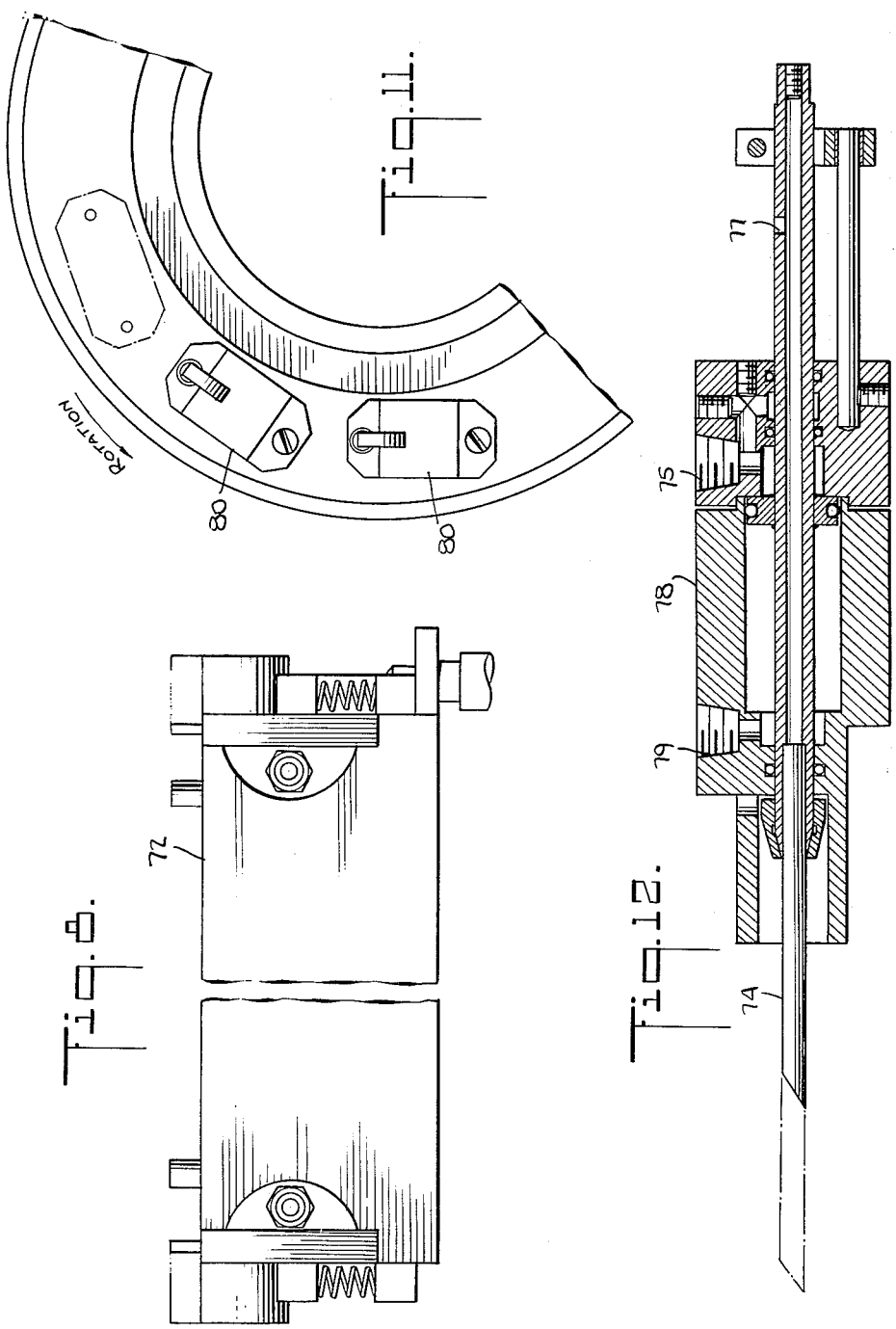

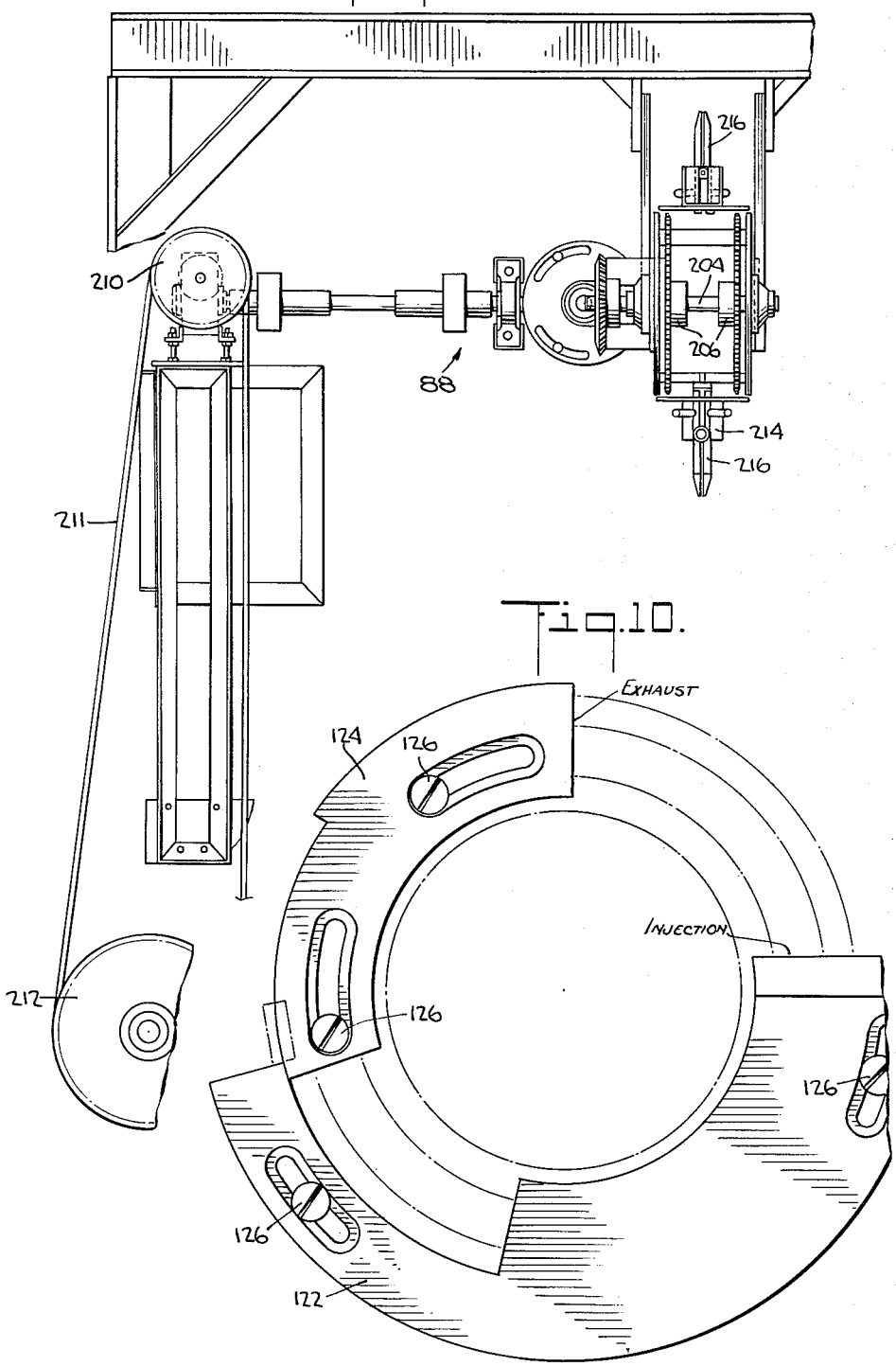

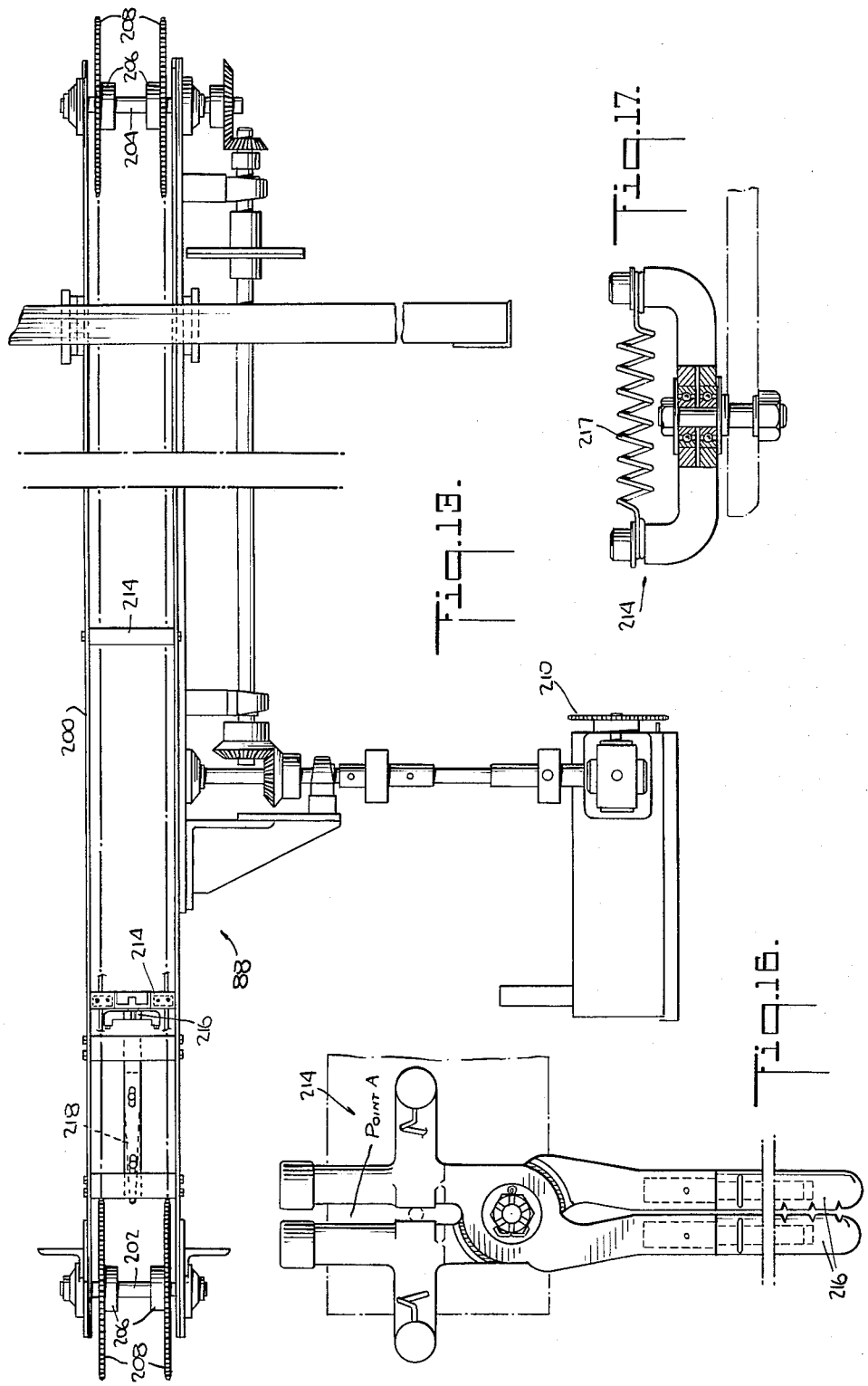

Nov. 23, 1965  E. BARKER  3,218,669
BLOW-MOLDING APPARATUS
Filed Nov. 1, 1961  14 Sheets-Sheet 8
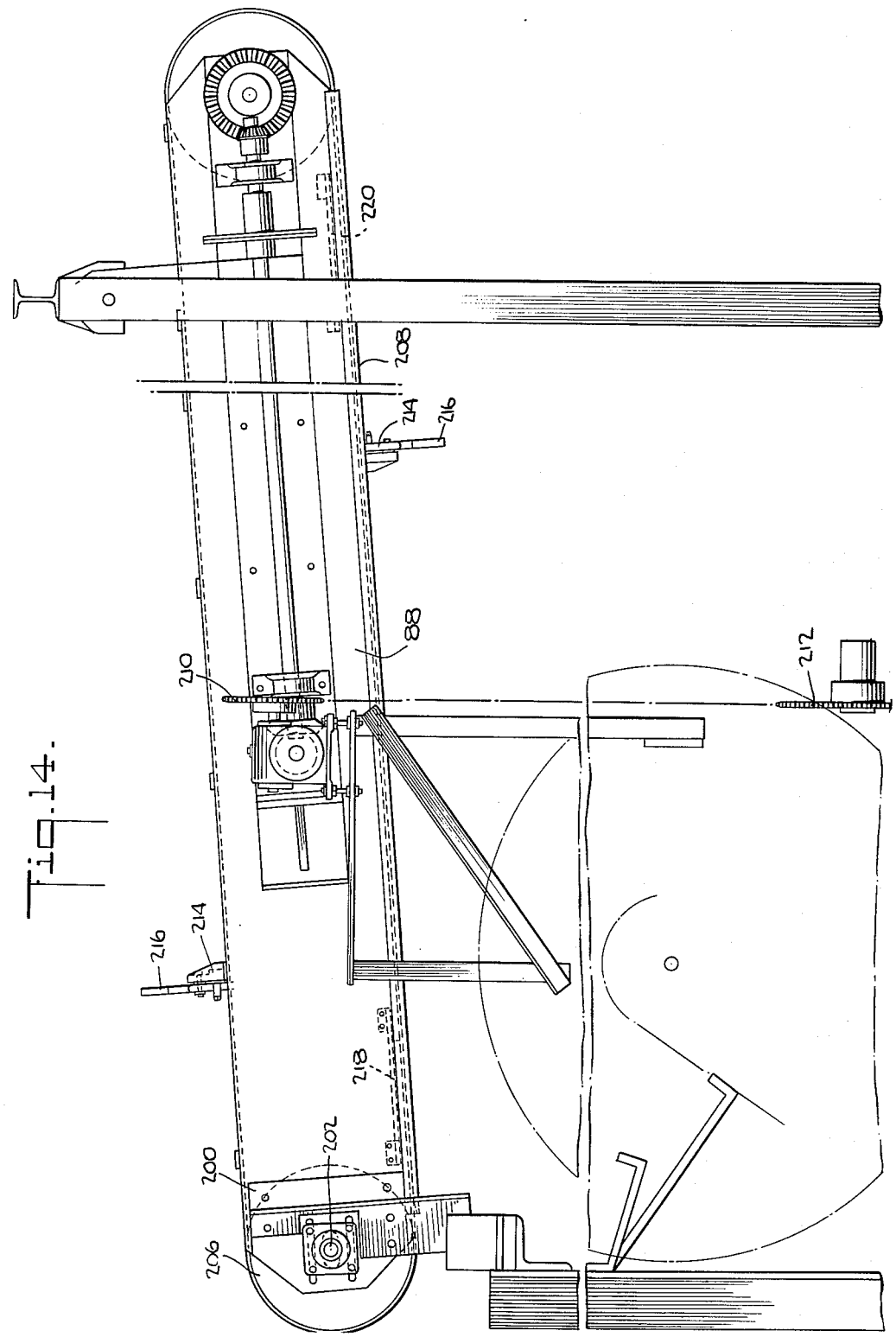

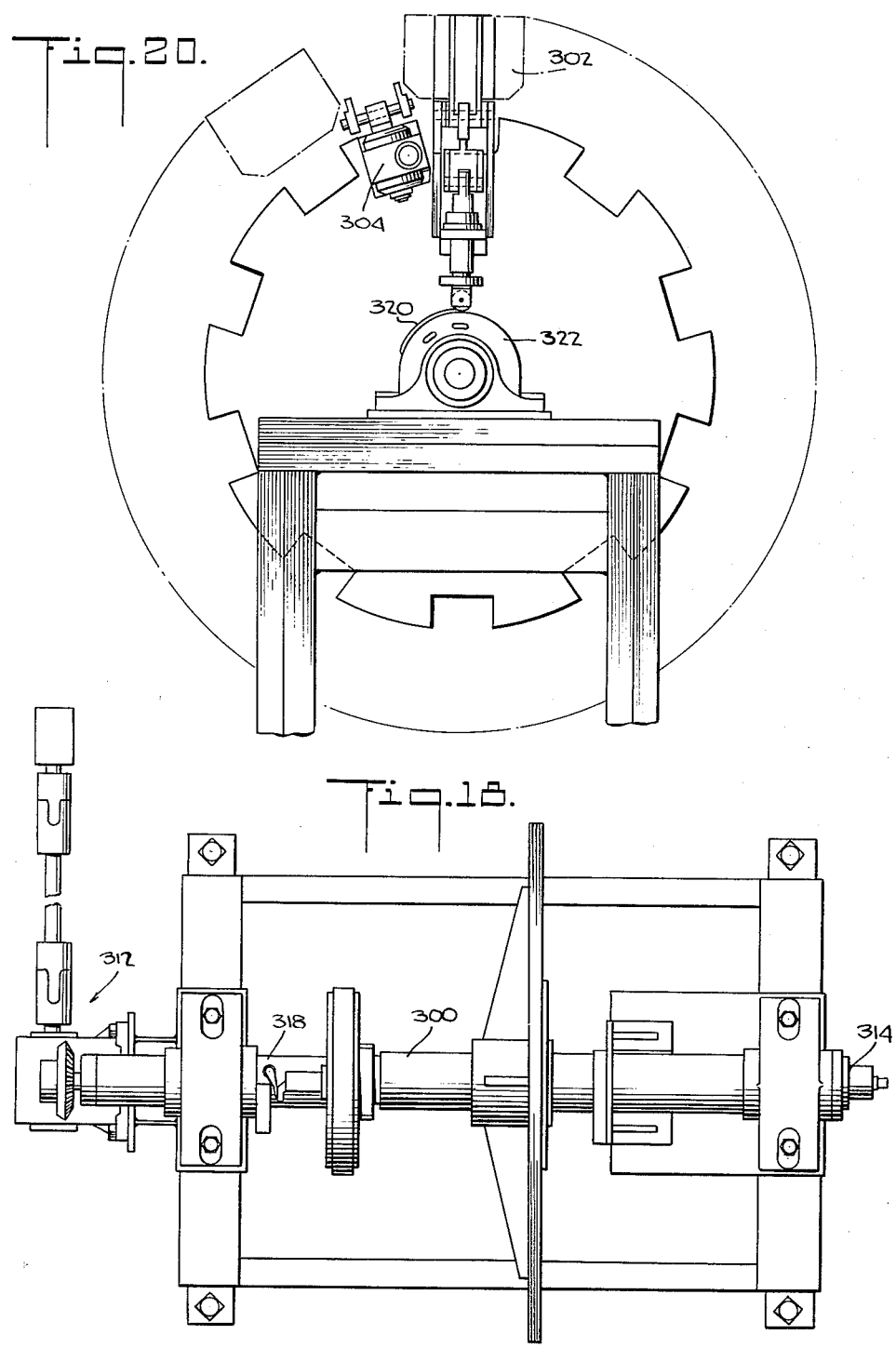

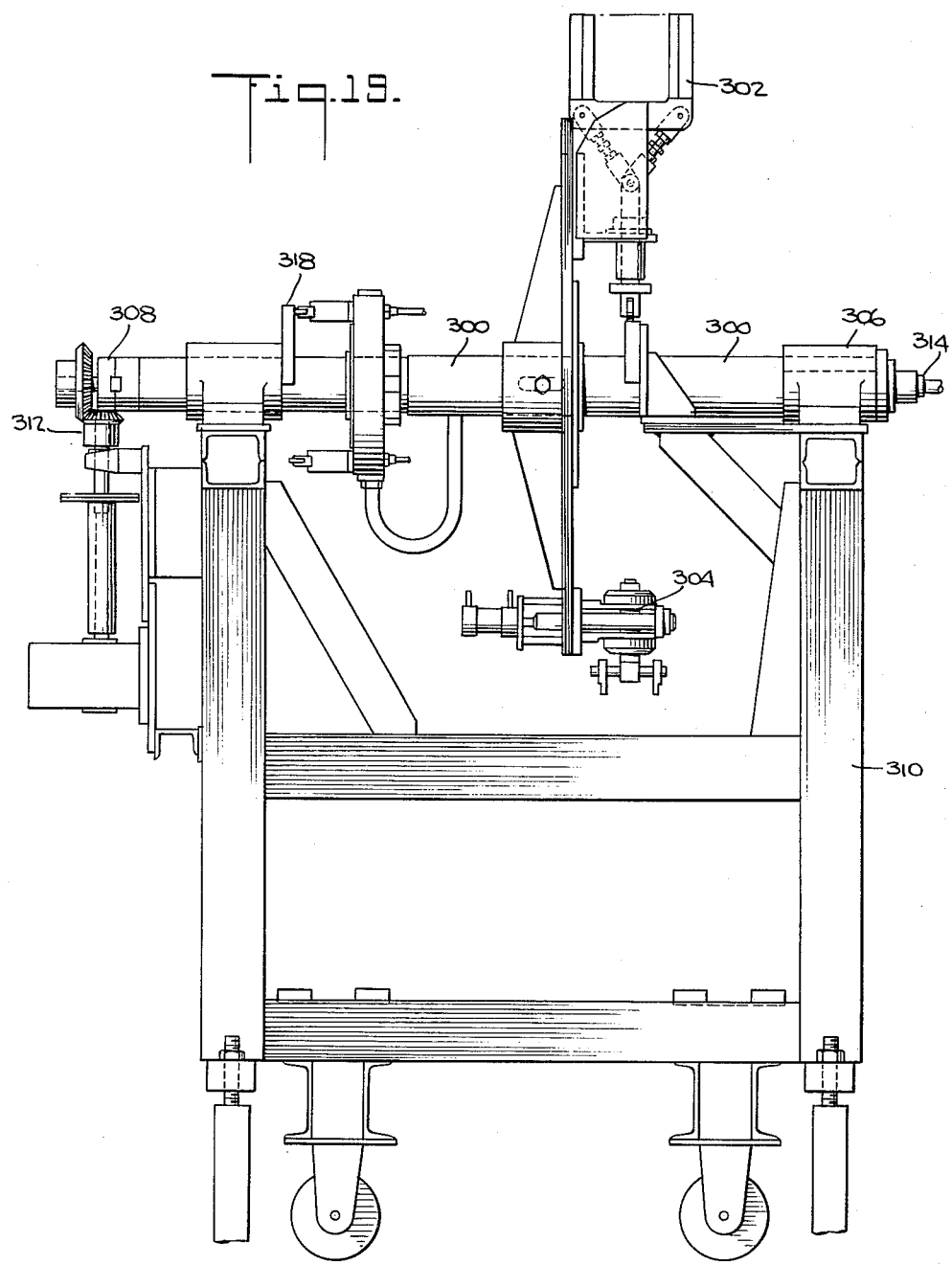

Nov. 23, 1965  E. BARKER  3,218,669
BLOW-MOLDING APPARATUS
Filed Nov. 1, 1961  14 Sheets-Sheet 11

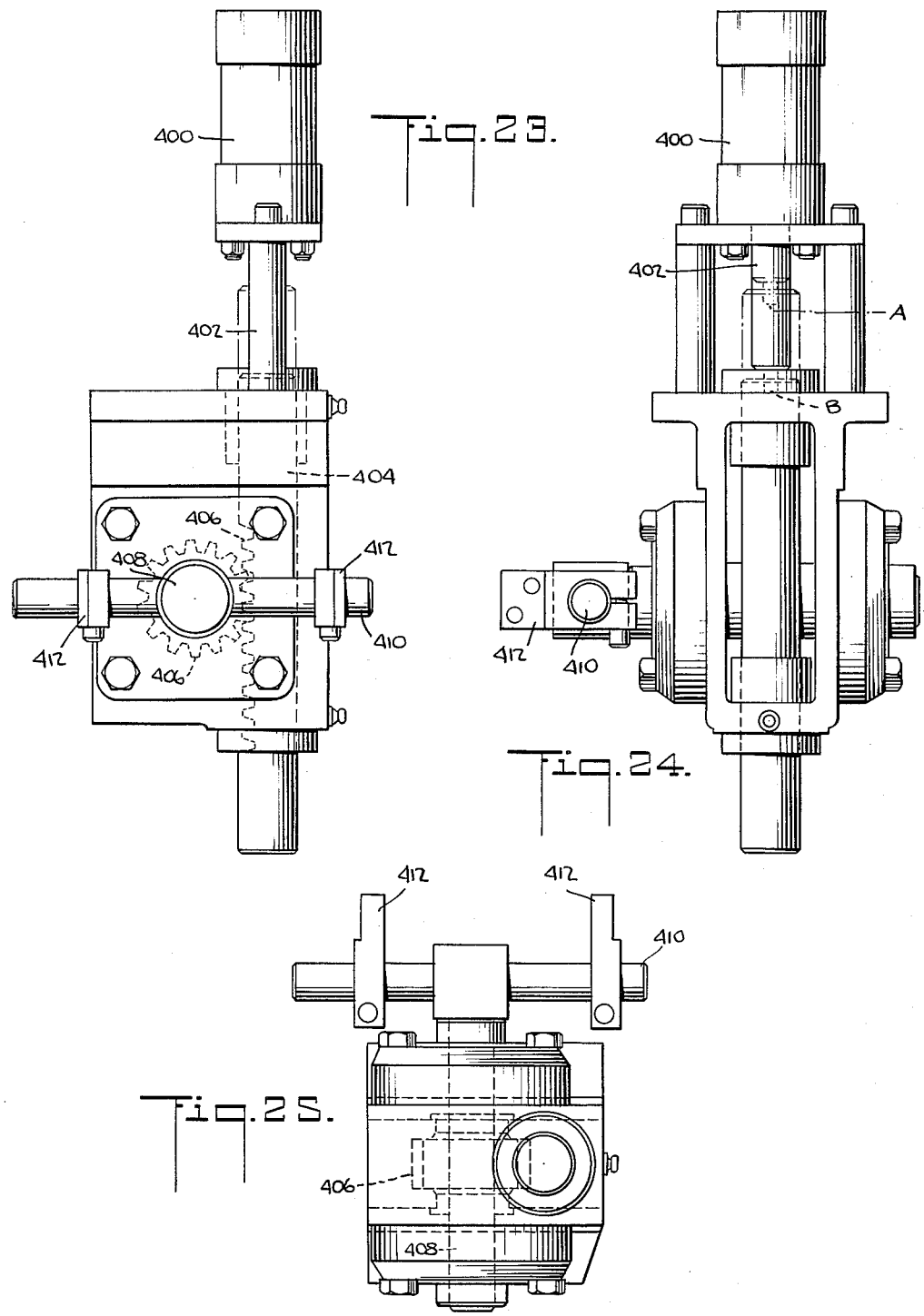

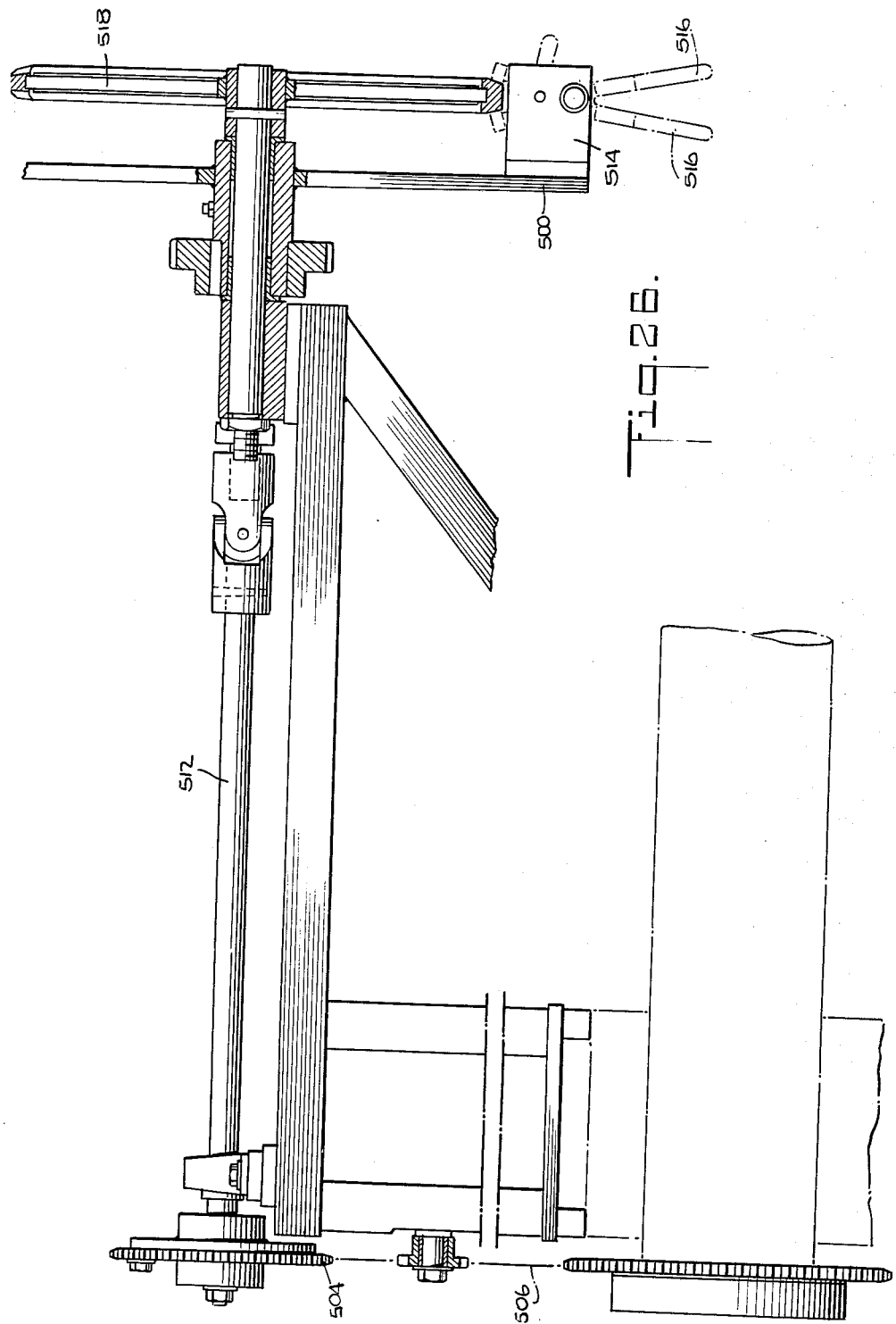

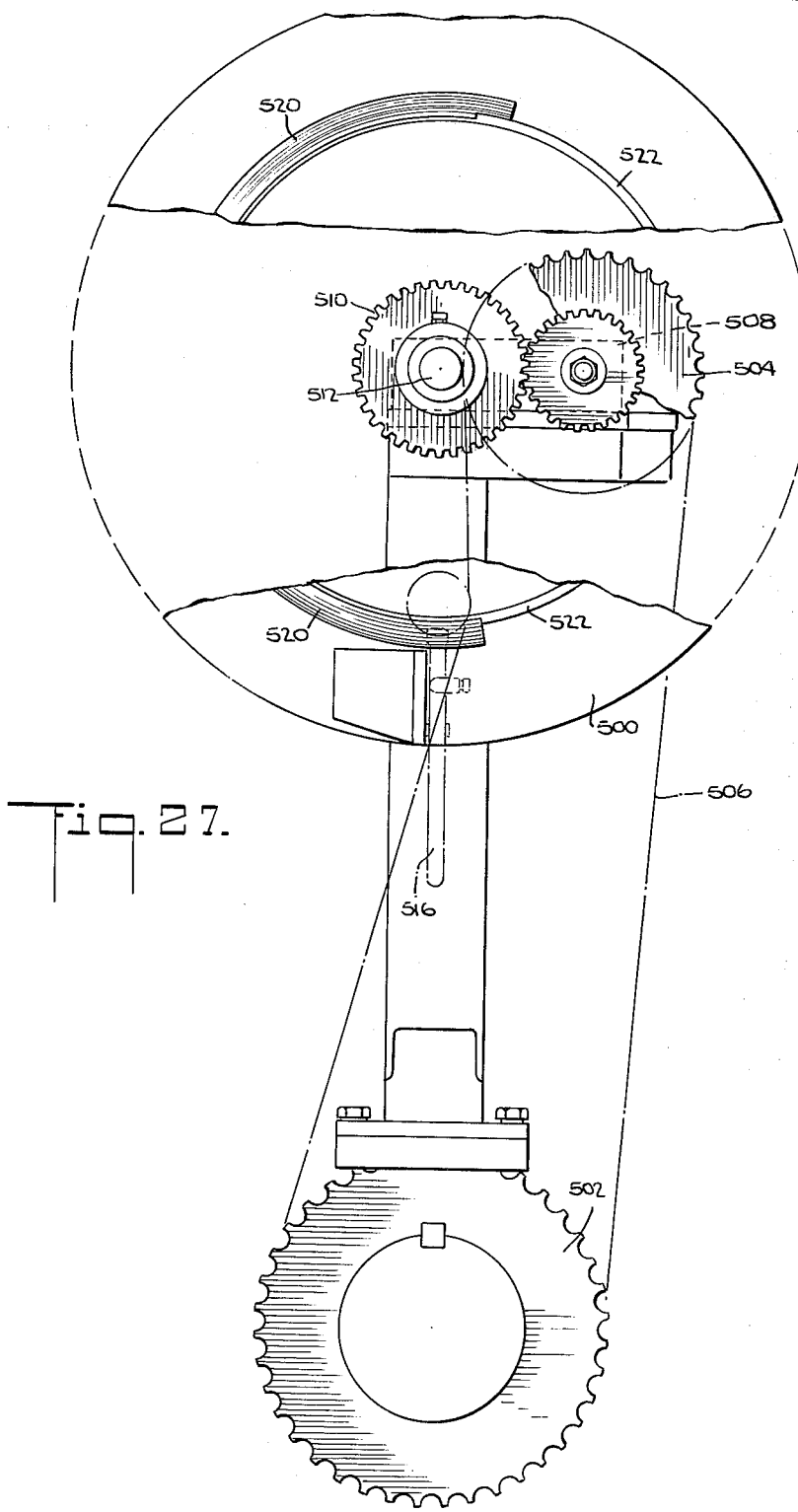

United States Patent Office

3,218,669
Patented Nov. 23, 1965

---

3,218,669
BLOW-MOLDING APPARATUS
Edgar Barker, Toronto, Ontario, Canada, assignor to Celanese Corporation of America, New York, N.Y., a corporation of Delaware
Filed Nov. 1, 1961, Ser. No. 149,436
9 Claims. (Cl. 18—5)

This invention is directed toward blow-molding apparatus for molding hollow articles from a softened hollow preform (parison) of plastic material, the article being produced by first completely enclosing the parison in a mold and subsequently inflating the parison to final shape.

More particularly, this invention is directed toward blow-molding apparatus of the tangential feed, vertically rotary type. In this apparatus, a plurality of molds are equidistantly spaced about the periphery of a mold carrier rotating in a circular path in a vertical plane. A molten parison tube is extruded vertically downward in a position which is tangent to the rotating carrier. Each of the molds closes in sequence upon the tube as the tube is positioned tangentially between the open halves of the mold. As each mold closes, the ends of the parison trapped in the mold cavity are sealed. A hollow blowing needle is then pushed into the mold cavity and punctures the parison. A fluid such as air introduced through the needle into the cavity to blow the parison into its final shape. At a later point in the cycle, the blown parison exhausts the contained air to atmospheric pressure. Thereafter, the mold is opened, and the molded articles, joined neck to tail, can be removed from the apparatus.

The above described apparatus of the tangential feed, vertically rotary type, while finding an increasing range of applications, is still subject to a number of serious disadvantages. For example, the blowing needle must be pushed quickly into the parison and also must be removed quickly from the mold cavity, otherwise the parison will not be blown properly. Conventionally, air is forced through the needle as the needle is moved back and forth. As a result, the diameter of the needle must be small, otherwise the air pressure will be reduced below a tolerable value during needle movement. This small diameter limits the rate at which air can be introduced into the parison. Consequently, relatively long blowing and exhaust periods are required, and the rate of production of molded articles is limited by the lengths of these periods. In addition, the entire sequence of trapping the parison, blowing the parison to shape, exhausting the blown parison and opening the molds is performed over about 180° of rotation. Since one cycle of operation occurs in 360° of rotation, about one half of the cycle is nonproductive and the rate of production is again limited.

Moreover, the mold closing mechanism conventionally employed functions in such manner that the mold halves will, from time to time, be brought together off center with respect to the parison tube. Under these conditions, the article to be formed will be molded off center; consequently the article normally will fail to meet specifications and will be scrapped. In addition, the molded articles, when completed, often tend to stick in the mold and have then to be removed by hand. Indeed, the entire string of molded articles must be removed from the apparatus by an operator—this is an expensive and time-consuming procedure. Furthermore, each of the various operations performed by the apparatus, such as the opening and closing of the molds, and the blowing and cooling of the desired article, are often subject to undesired variations in the timing of the operations sequence, and an excessive rejection rate ensues.

It is an object of this invention to provide new and improved blow-molding apparatus of the tangential feed, vertically rotary type, which overcomes all of the difficulties indicated above.

Another object is to provide new and improved blow-molding apparatus of the type indicated wherein the nonproductive portion of the 360° operating cycle is sharply reduced whereby the rate of production of molded articles can be correspondingly increased.

Still another object is to provide new and improved blow-molding apparatus of the type indicated wherein the diameter of the blowing needle is substantially increased over that heretofore employed without appreciably reducing the air pressure, thereby sharply reducing the durations of the blowing and exhaust periods and thus permitting a sharp increase in the rate of production of molded articles.

Yet another object is to automatically remove molded articles in selected sequence from the molds of blow-molding apparatus of the tangential feed, vertically rotary type, thus eliminating the manual operation previously required.

Still a further object is to provide means for automatically and continuously removing molded articles from blow-molding apparatus and transferring these articles to a detabbing station, said means being either a straight or circular conveyer.

Yet a further object is to provide tangential feed, vertically rotary blow-molding apparatus which includes a mechanism for automatically detabbing molded articles.

Still another object is to control the movement of the blowing needle in apparatus of the type described in such manner that air cannot be forced through the needle until the instant the needle punctures the parison, thus permitting the use of needles of much larger diameter than heretofore employed.

Another object is to provide new and improved blow-molding apparatus of the type indicated wherein the movement of mating mold halves is controlled by rack and pinion gear linkages in such manner that these halves cannot be brought together off center with respect to the parison tube.

Yet another object is to provide new and improved blow-molding apparatus of the type indicated wherein each mold contains a controlled short stroke spring loaded section for the purpose of providing positive ejection of the molded article.

A further object is to provide new and improved apparatus of the type indicated wherein the timing of the operations sequence is carefully controlled throughout the entire operations cycle, and wherein the molds are held positively open or positively closed during the appropriate portions of the cycle.

These and other objects of this invention will either be explained or will become apparent hereinafter.

In accordance with the principles of this invention, a plurality of mold units are equidistantly spaced about the periphery of a mold unit carrier arranged for rotation in a vertical plane. Each mold unit describes a circular path in this vertical plane and, further, the angular position of each mold unit with respect to the vertical changes continuously through 360° of position as the carrier completes one revolution or cycle.

A molten parison tube is extruded vertically downward and tangentially to the rotating carrier. Each of the mold units consists of two mating halves which are controlled by rack and pinion gear linkages in such manner as to be moved toward and away from each other along a horizontal path.

As each mold unit is swung downward into tangential registration with the parison tube, the mold halves close together upon the tube, and seal the ends of the parison trapped in the mold cavity. These halves are then mechanically locked into place, and are only unlocked when the mold unit approaches the conveyor as will be explained hereinafter.

At the point of closure, a hollow needle mounted in one of the mold halves is pushed into the parison, and air is forced through the needle and blows the parison to the contour of the mold. The needle has a relatively large diameter. However, the needle movement is so controlled that air cannot be forced through the needle until the needle is in blowing position. (Thus, the duration of the blowing and exhaust periods can be reduced, and the rate of production can be accordingly increased. Moreover, the parison as blown is chilled almost instantaneously with consequent improvement in quality of the blown container.)

As the mold continues its circular movement, the needle is retracted from the parison, and the blown shape is permitted to exhaust the contained air to atmospheric pressure. As the mold swings through a major arc of a circle, for example, an arc of about 270° (using the point tangential registration as a reference point of 0°), the mold halves are positively separated from each other. Controlled short-stroke, spring-loaded sections of the actual blown shape, incorporated into each mold half, hold the blown container on center as the mold halves move equidistantly away from the center.

When high production rates are required, the molded articles can be automatically removed from the molds and detabbed. To accomplish this action, pickup fingers carried on a straight overhead conveyor are timed to close upon the interconnecting tab as each mold is opened. These fingers, moving along a straight line, remove the interconnected blown containers in a direction tangent to the mold carrier and transfer these interconnected containers to a detabbing machine.

This machine includes a plurality of container support jaws equal in number to the plurality of mold units. These jaws are equidistantly spaced about a detabber wheel arranged for rotation in a vertical plane in synchronism with the mold unit carrier.

The machine further includes a like plurality of detabbing elements interleaved with the jaws so that an element is positioned between each two adjacent jaws.

At a given point, as a container is transferred from the pickup fingers to a jaw in the detabbing machine, the jaw is closed and grips the container in transit. The associated detabbing element is then activated and severs and removes the interconnecting tab. Subsequently, the jaw is opened, and the free container is released.

If desired, the molded articles can be automatically removed from the molds and manually detabbed. In this situation, a circular conveyor is positioned above the mold carrier. This conveyor carries a plurality of pickup fingers rotating in a vertical path, the direction of rotation being opposite to that of the mold unit carrier. These fingers are designed to close upon the interconnecting tab as each mold is opened. The fingers remove the interconnected blown containers in a direction tangential to the mold carrier. An operator removes the interconnected containers from the circular conveyor and manually detabs them.

Illustrative embodiments of this invention will now be described with reference to the accompanying drawings wherein:

FIG. 1 is a side view of blow-molding apparatus in accordance with the invention.

FIG. 2 is an end view of the extruder and mold wheel of the apparatus in FIG. 1.

FIGS. 3 and 4 are respective side and end views of individual mold units of the apparatus of FIG. 1.

FIG. 5 is a sectional view of stationary interference cams used to close and open the mold units of FIGS. 3 and 4.

FIG. 6 is a developed view of the interference cams used to close and open the mold units of FIGS. 3 and 4.

FIGS. 7 and 8 are respective side and end views of mold halves as employed in the mold units of FIGS. 3 and 4.

FIG. 9 is a side view of the air manifold and associated equipment for controlling the air-blowing and air-exhaust operations of the apparatus of FIG. 1.

FIGS. 10 and 11 are views taken along the lines C—C and B—B respectively in FIG. 9.

FIG. 12 is a cross-sectional side view of the air cylinders for injecting air into and exhausting air from the parison trapped in the mold unit of FIGS. 3 and 4.

FIGS. 13, 14 and 15 are top, side and end views respectively of a straight-line conveyor as utilized with the apparatus of FIG. 1.

FIGS. 16 and 17 are front and cross-sectional views respectively of a finger support mechanism used in the conveyor of FIGS. 13, 14 and 15.

FIGS. 18, 19 and 20 are top, side and end views respectively of a detabbing machine used with the apparatus of FIG. 1.

FIGS. 23, 24 and 25 are top, side and end views respectively of a cut-off unit used in the detabbing machine of FIGS. 18, 19 and 20.

FIGS. 26 and 27 are side and end views respectively of a circular conveyor adaptable for use with blow-molding apparatus of the type shown in FIG. 1.

Figure 21:
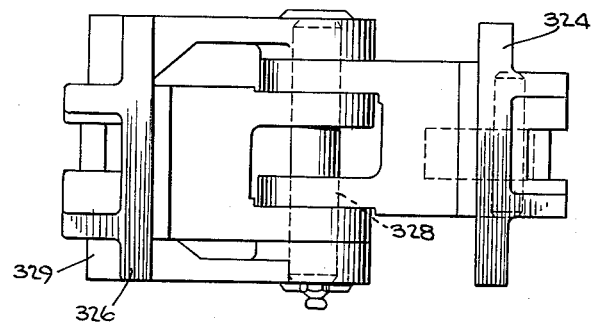
FIGS. 21 and 22 are top and side views respectively of a jaw mechanism used in the detabbing machine of FIGS. 18, 19 and 20.

The apparatus shown in the figures utilizes ten molding stations, and is designed to blow hollow-formed containers such as polyethylene bottles. Typically, the containers range in capacity from 8–32 ounces.

Referring now to FIGS. 1 and 2, the general organization of the apparatus will first be described. The apparatus comprises a horizontal, hollow rotatable main driving shaft 30. Ten equidistantly spaced mold-carrying units 32 are radially mounted about and secured to shaft 30. All of units 32 lie in the same vertical plane.

Shaft 30 is supported at each end by cast-iron pillow blocks 34 and 36, these blocks being mounted on a welded steel frame 38. A 120 teeth worm wheel 40, keyed to shaft 30, is coupled to a single start worm meshing 42 which in turn is driven through V belts 44 from a 4:1 three horsepower, variable speed unit 46.

An extruder 48 feeds a plastic annular parison tube 52 through a head 50 vertically downward and tangential to the vertical circular rotating path of mold units 32. The parison tube can have an annular cross section with a typical outer diameter of .687 inch and a typical inner diameter of .312 inch.

Air must be supplied to each mold in proper timing to blow the parison. Air is supplied from an air compressor through nylon hoses (not shown in FIGS. 1–2) to a first manifold 56 on shaft 30, air being supplied to manifold 56 from a rotating joint 58.

Water is supplied through nylon hoses through a second manifold 62 to the mold halves. This manifold 62 is fed with water from the center of shaft 30 through a two-way rotating joint 64 at one end thereof. For proper forming of the parison, the temperature of the mold halves must be maintained within a given range which will depend upon the plastics employed. With certain conventional plastics such as polyethylene this range can be 120°–180° F. This is accomplished by continuously circulating water at proper temperatures through the system. To this end, a fractional horsepower centrifugal pump, mounted in a ten-gallon tank, pumps water at approximately 10 pounds per square inch pressure through joint 64 to the manifold 62. From this manifold separate nylon feed lines (not shown in FIGS. 1 and 2) run to each mold half (which has water circulation channels drilled therein), through this half to the manifold. The water is then piped along the main shaft 30 through joint 64 back to the tank. The water temperature is maintained by heating the water, when necessary, by means of an electric immersion heater in the tank. When it is required to lower the temperature, cold water, manually controlled by a needle valve is circulated through a copper cooling coil immersed in the tank. A thermometer in the tank indicates the water temperature.

Further, since the molds close within a minimum of time after the extrudiate has been extruded through the extruding head, the parison temperature is not appreciably affected during the period in which the molten parison is exposed to the air before being trapped in the mold.

The mold halves 66 and 68 are opened and closed by the action of stationary interference cams 84. An overlock toggle device holds the mold halves in the closed position to eliminate any requirement to hold these halves closed by mechanical work. (The action of cams 84 and the toggle device will be described in more detail hereinafter.)

Cams 84 hold the mold halves open as the mold unit 32 carrying these halves swings downward into tangential registration with the extrudiate. As these mold halves pass under the head 50, cams 84 cause the mold halves to close, encasing the parison and sealing the ends of same. The toggle device then positively holds the mold halves closed. (The movement of the mold halves is equidistant about the center line of the extrudiate, thereby positively insuring that the mold halves meet on center.)

At the instant of mold closure, stationary interference cams 82 (which control the air-blowing cycle in a manner described in more detail hereinafter) cause air to enter the parison and blow it to the contour of the mold.

After the mold unit 32 containing the encased and blown parison is rotated through an arc of about 250°, cams 82 permit the blown shape in the mold to exhaust the contained air to atmospheric pressure. For a 24-ounce container, an arc of about 15° is required to exhaust the air in this manner.

As the mold unit 32 containing the blown and exhausted container swings through a completed arc of 265° (using the reference point of 0° previously indicated) and thus attains the highest horizontal position on the vertical circular path, cams 84 unlock the toggle device and cause the mold halves to open. Spring-loaded sections then hold the blown container along the center line of the mold while the mold halves moving equidistantly away from the container.

It will be noted that the unproductive section of the cycle is reduced to a minimum by positioning the extruding head between the point of take-off and the point of mold closure about 2½ inches above the point of closure.

At this point the blown containers can be picked off by a conveyor. However, before the conveyor action is described, the action of the interference cams 82 and 84, and the rack and pinion mechanism will be described in more detail.

Referring now to FIGS. 3 and 4, the two mold halves 68 and 66 of mold units 32 contain bores or channels 100 through which the water is circulated, the water being fed in and out through nylon hoses 60. These figures also show the blowing needle 74.

The mold opening and closing action is as follows. A bell crank 102 is attached to the end of a forked arm 104. Attached to the arm 104 is a sliding member 106 with two sets of rack teeth 108 cut into the opposite end. This member 106 is attached to platen 110 and is free to slide through platen 112. Platen 112 is attached to two racks 114 which mesh with two gears 116. Gears 116 mesh with the rack teeth 108 of the sliding member 106. Thus, as the sliding member is moved back and forth, the two mold halves move equidistantly toward and away from each other. When the mold halves are fully closed, an overlock toggle device 86 holds the halves in the closed position to eliminate any requirement to hold these halves closed by mechanical work. The toggle device 86 is unlocked when the molds are opened. As shown in FIG. 3, the toggle device is in the overlock position.

The stationary interference cams 84 which control the positions of the bell crank 102 and toggle device 86 are shown in FIG. 5 (which is a cross-sectional view of the cams 84 shown in FIG. 1) and FIG. 6 (which is a developed view of FIG. 5 as taken along A of FIG. 5).

Both the bell crank 102 and the toggle device 86 roll along fixed surfaces 118 which can be moved toward and away from each other by adjustment screws 120 to determine the length of arc in which the mold halves are opened and closed. The opened and closed positions are shown in FIGS. 5 and 6. About 21° of arc are required for the mold halves to shift from the closed position to the open position. The maximum arc from the fully closed position of the molds to the fully opened position is 265°.

As the mold opens, and the two mold halves move equidistantly away from each other, controlled short-stroke, spring-loaded sections of the actual blown shape, mounted in each mold half, hold the blown container on the center line and thereby positively eject said container to permit easy pick-off by the conveyor. These sections, in the extended position (i.e., with the mold halves open) are shown at 72 in FIGS. 7 and 8.

The air-blowing and exhaust operation will now be described with reference to first FIG. 12, then with further reference to FIGS. 9, 10 and 11.

As shown in FIG. 12, mounted on each mold unit 32 is an air cylinder 78 controlling the position of the blowing needle 74. At the instant of mold closure, air is introduced into the back end of the cylinder at port 75 moving hollow rod 76 and the needle 74 to which rod 76 is attached forward until needle 74 pierces the nearest wall of the encased parison. At the end of the forward stroke, a hole 77 in the rod is aligned with port 75, and air passes through hole 77, rod 76 and needle 74, enters the parison and blows it to the contour of the mold. (It will be noted that the position of the needle 74 in the mold half 68 is such that the puncture is made in that portion of the neck of the container which is subsequently removed to form the opening or mouth of the container.)

After the mold unit 32 containing the blown parison is rotated through the desired portion of the arc, air is introduced into the front end of the cylinder at port 79 moving hollow rod 76 and needle 74 backward to withdraw the needle from the parison. At the beginning of the rearward stroke, as shown in FIG. 12, the hole 77 in rod 76 is vented to the atmosphere, and the blown shape can then exhaust the contained air to atmospheric pressure through the vent thus formed.

It will be apparent from the foregoing that air is only introduced into the pairson from the needle after the cylinder has completed its forward stroke. Consequently, a much larger needle diameter, for example a diameter of .156 inch, can be used instead of the 14-gauge needle heretofore used. At the same time fast entry of the needle into the parison is obtained without danger of collapse of the parison. Thus the durations of the blowing and exhaust periods are sharply reduced and a sharp increase in the rate of production of molded articles is obtained.

Note that each cylinder 78 is fitted with a pet cock. Otherwise, when the machine is initially started, the loss of air pressure, due to the absence of blown containers in the molds at this point, will prevent the advance of the blowing needle. When starting up, each pet cock is opened in turn as the mold halves close on the parison.

The action of the cylinders 78 is controlled by stationary interference cams 82 as will be explained with reference to FIGS. 9, 10 and 11.

Attached to manifold 56, which rotates with shaft 30, are ten air valves 80, each of which controls the supply of air to a corresponding cylinder 78. Air is supplied to each of valves 80 as shown in FIG. 9. Each of valves 80 is provided with a cam roller 120 which rides half on each side of two curved cam surfaces 122 and 124 (FIG. 10) which constitute the stationary interference cams 82. As the roller 120 rotates to the point marked INJECTION in FIG. 10, the roller rolls off surface 122. This change in roller position causes valve 80 to supply air to port 75 in cylinder 78 and thus initiate the air injection process. As the roller further rotates to the point marked EXHAUST in FIG. 10, the roller rolls onto surface 124. This change in roller position causes valve 80 to supply air to port 79 and thus initiate the air exhaust process. Note that the degree of rotation required by the separation of cam surfaces 122 and 124 which determines the period of the air injection and exhaust operation outlined above, can be decreased or increased by moving these surfaces toward or away from each other by means of adjustment screws 126.

When high production rates or long production runs are required, for example, 1200–1800 containers per hour, the molded articles can be automatically removed from the molds by a conveyor and thereafter transferred by the conveyor to a detabbing machine.

A conveyor 88 for this purpose is shown in FIGS. 13, 14 and 15. This conveyor 88 comprises a slightly inclined frame 200 having horizontal rotatable shafts 202 and 204 journalled in opposite ends thereof. Shaft 202 is mounted adjacent the container pickup end of the conveyor (which is the low end) and shaft 204 is adjacent the container discharge end of the conveyor (which is the high end). Pulleys 206 are secured to opposite ends of both shafts adjacent the inside of frame 200 and rotate in vertical planes as the corresponding shafts rotate. Endless chains 208 extends between corresponding sets of pulleys 206. Shaft 204 is mechanically connected through gears and shafts to a pulley 210. This pulley 210 is connected by another endless chain 211 to a driving pulley shaft 30 of the blow-molding apparatus. Consequently as shaft 30 rotates, chains 208 are pulled around pulleys 206. (The drives for the blow-molding apparatus and the conveyor are operated in this manner to assure proper synchronization between the conveyor and the blow-molding apparatus.)

A plurality of equidistantly spaced finger support mechanisms 214 are secured at opposite ends to chains 208 and are rotated in a vertical plane thereby. Secured to each finger support members are two generally vertical Teflon pickup fingers 216. These fingers are normally closed and in contact with each other, positive closure being maintained by spring loading.

The pickup end of the conveyor 88 terminates in a position adjacent the 265° completed arc position of the mold unit (i.e., the point at which the molds open and the molded containers are ejected). As the closed pickup fingers swing around shaft 202 and move along the bottom portion of chains 208, the finger support mechanism contacts the apex of a horizontal V-shaped member 218 (which is a stationary interference cam) and the closed fingers are forced open. As these fingers are moved completely past this member, they are closed by spring action. The timing is so arranged that these fingers close upon the interconnecting tab on the ejected container. The closed fingers move along a straight line thereby removing the interconnected blown containers (with the bottom end of the container leading the top end or vice versa) in a direction tangent to the pitch diameter of the center line of the mold unit. As the closed fingers approach the discharge end of the conveyor for transfer to the detabbing machine, the finger support mechanism moves into contact with a second horizontal V-shaped member 220 (which is another stationary interference cam) and are opened and then closed in the same manner as before. In this way, the joined blown containers are released and transferred to the detabbing machine.

The pairs of pickup fingers are spaced apart from each other at such distances and travel at such a speed as to match the pitch line speed and spacings of the molds.

FIGS. 16 and 17 are views of the finger support mechanism 214 showing the fingers 216 in the closed position and the spring 217 for maintaining closure. The fingers are opened as the apex of the horizontal V-shaped interference cam penetrates point A in FIG. 16.

FIGS. 18, 19 and 20 show the general organization of the detabbing machine.

The machine comprises a horizontal hollow rotatable main driving shaft 300. Ten equidistantly spaced jaw mechanisms 302 are radially mounted about and secured to shaft 300. All of mechanisms 302 line in the same vertical plane and have the same pitch diameter as mold units 32 of the blow-molding apparatus. Ten equidistantly spaced cut-off units 304 are radially mounted about and secured to shaft 300. The units 304 lie in the same plane as mechanisms 302 and are interleaved therewith whereby a unit 304 is interposed between each two adjacent mecahnisms 302.

Shaft 300 is supported at each end by cast-iron pillow blocks 306 and 308, these blocks being mounted on a welded steel frame 310. A gear train 312 connected to the variable speed unit 46 of the blow-molding apparatus rotates shaft 300 in synchronism with shaft 30 of the blow-molding apparatus. (This is required to insure that the blown containers can be detabbed at the same rate at which the containers are ejected from the molds.)

The purpose of the detabbing machine is to grasp each interconnected container in turn (as it is released by the pickup fingers of the straight-line conveyor) in a jaw mechanism 302 as the jaw assumes a top horizontal position. As the container leaves the conveyor, the jaws close and grip the container in transit. The cut-off unit 304 adjacent this mechanism then severs the tab connected to the container. As the jaw mechanism reaches a vertical position, the jaws open, thereby allowing the severed container to drop onto a conveyor belt positioned below the rotating mechanisms.

Air must be supplied to each cut-off unit 304 in proper timing to sever the tabs between containers. Air is supplied from an air compressor through nylon hoses (not shown) through a rotating joint 314 and hollow shaft 300 to an air manifold 316. Stationary interference cams 318 on shaft 300 supply air for controlling the cut-off units' cutting operation as will be described in more detail hereinafter.

A raised cam surface 320 on a rigid stationary curved cam 322 secured to frame 310 cooperates with the jaw mechanisms 302 to open and close the jaws as required.

Figure 22:
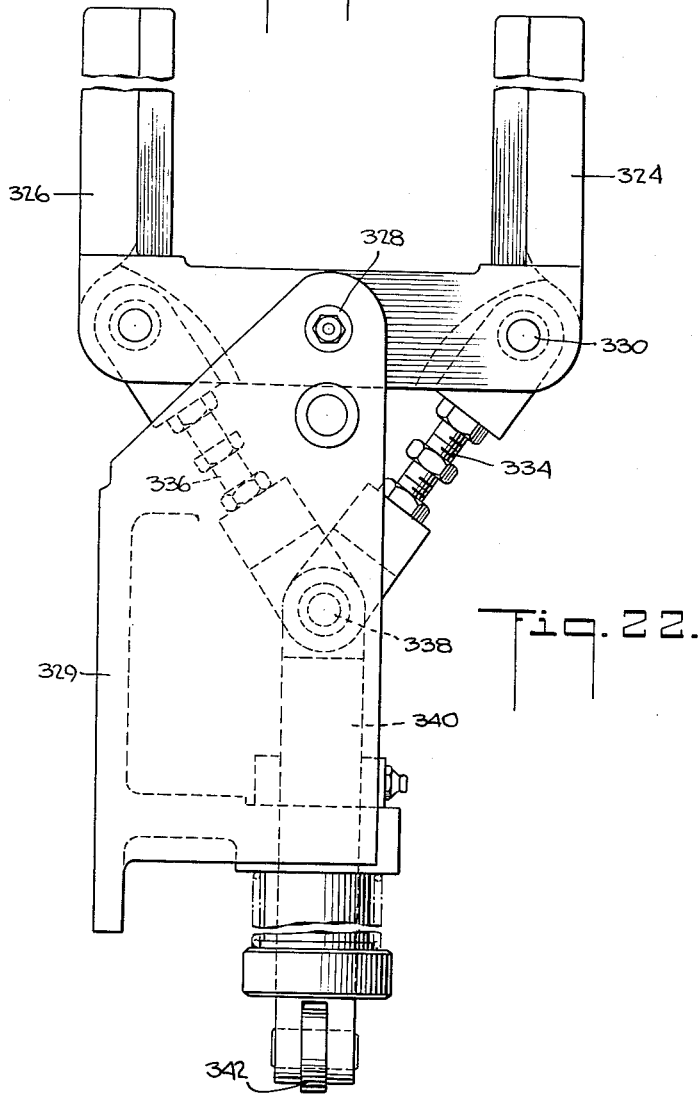

The operation of the jaw mechanisms 302 can best be understood from referring to FIGS. 21 and 22.

Each jaw mechanism comprises a pair of L-shaped jaws 324 and 326 pivotable together about shaft 328. Each of jaws 324 and 326 is pivoted about corresponding shafts 330 and 332. Shaft 328 is journalled within rigid frame 329. Inclined straight members 334 and 336 connect shafts 330 and 332 respectively to shaft 338. A vertical member 340 is connected at one end to shaft 338 and at the other end terminates in a cam roller 342 which contacts the surface of cam 322.

Mold halves (not shown) cast from an epoxy resin to the approximate shape of the blown container are attached to the jaws 324 and 326.

The jaws in each jaw mechanism are normally open. However, as each mechanism approaches the top vertical position, its cam roller 342 contacts the raised cam surface 320 on cam 322. Vertical member 340 is pushed upwards within frame 329. Inclined members 334 and 336 then push upwards against jaws 324 and 326. Since shaft 328 does not move upwards, jaws 324 and 326 pivot toward each other and the jaws close upon the container. As the closed jaw mechanism is rotated further through a 90° arc to a vertical position, cam roller 342 rolls off the raised surface 320, the jaws resume their normal open position and the container is released in the manner described.

The cut-off unit 304 is shown in FIGS. 23, 24 and 25. An air cylinder 400 has a piston 402 having a withdrawn position at A and an advanced position at B as shown in FIG. 24. Piston 402 is secured to an elongated slidable member 404 having rack teeth 406. These teeth engage a pinion gear 406 which is secured to shaft 408. Shaft 408 is secured to the midpoint of bar 410 (which is perpendicular to shaft 408). Cutting blade support arms 412 are rigidly attached to opposite ends of bar 410. Cutting blades (not shown) are secured to the support arms 412.

Thus, a piston 402 is advanced, bar 410 is rotated through a short arc about shaft 408. When the piston 402 is withdrawn, bar 410 is rotated in reverse direction through this arc to return to its original position. Note that when the bar is in its original position and a tab to be cut is positioned adjacent the bar, the bar and tab are both essentially horizontal. However, the axis of the bar is nonparallel with the axis of the tab so that the two cutting blades on the bar are positioned on opposite sides of the tab. When piston 402 is advanced, one blade cuts through one end of the tab in one direction from one side, while the other blade cuts through the other end of the tab in an opposite direction from the other side.

The air cylinder 400 is constructed and controlled in the same general manner as air cylinder 78 of the blow-molding machine with air being supplied to the rear end of cylinder 400 to advance piston 402 and being supplied to the front end of cylinder 400 to withdraw cylinder 402. However, there is no necessity to blow air through piston 402 (since no blowing operation is required). Hence, piston 402 is solid rather than hollow as is required for cylinder 78.

Ten air valves secured to manifold 316 and cooperate with stationary interference cams to control the flow of air to cylinders 400 in the same general manner as cylinders 78 are controlled in the blow-molding apparatus as shown in FIGS. 9, 10 and 11.

When low production rates or short production runs are required, the ten-station blow-molding apparatus represents excess tooling costs. Accordingly, six-station blow-molding apparatus (differing only from the ten-station apparatus previously described in that six mold units rather than ten mold units are used) can be used for this purpose. The resultant reduction in production rates makes it uneconomic to use the detabbing machine. Instead, an operator manually detabs the joined containers.

Under these conditions, the straight line conveyor shown in FIGS. 13, 14 and 15 can be replaced by a rotary type conveyor as shown in FIGS. 26 and 27.

The rotary conveyor comprises a circular wheel 500 positioned above the molding machine. A gear 502 on the main shaft of the blow-molding machine drives a gear 504 through a chain drive 506. Another gear 508 mounted on the same shaft as gear 504 rotating therewith rotates gear 510. Gear 510 and wheel 500 are on the same shaft 512 and rotate therewith. The purpose of this gearing is to rotate wheel 500 in a direction opposite to that of the mold units on the blow-molding apparatus. (Shaft 512 is parallel to the main driving shaft of the blow-molding apparatus.)

A plurality of finger support mechanisms 514 each having a pair of fingers 516 are secured to the periphery of wheel 500 at equidistantly spaced positions and rotate therewith, the fingers extending radially outward from the wheel 500. (Mechanisms 514 and fingers 516 are of the type shown in FIGS. 16 and 17.)

These mechanisms ride about a circular interference cam 518. The cam has a raised arc section 520 and a depressed arc section 522. As the finger mechanisms ride on the raised arc section 520, the fingers are forced open; as the mechanisms ride on the depressed arc section 522, the spring-loaded fingers are held closed. The lengths of the raised and depressed arc sections can be adjusted by sliding one over the other to adjust the lengths of the fingers closed and fingers opened periods.

When a mold unit in the blow-molding apparatus opens, the fingers in the appropriate finger mechanism close upon the interconnecting tab. As rotation of the wheel 500 continues, the molded container follows the pitch line of this wheel. When the container has rotated through an appropriate arc, for example about 90°, the fingers open releasing the interconnected containers to an inclined chute. At this point, an operator separates the molded containers from the tabs and places the detabbed containers in a conveyor belt.

Polyethylene has been used as an illustrative material. However, it will be apparent that the only limitation from the standpoint of the material used is that the material be workable. Thus, for example, thermoplastic and thermosetting materials and/or mixtures thereof with or without additives such as plasticizers, fillers, resins and the like, can be used.

Air has been used as a blowing agent. As known to the art, however, other gaseous or liquid agents can also be used for the same purpose.

It is to be understood that the foregoing detailed description is given merely by way of illustration and that many variations may be made therein without departing from the spirit of my invention.

Having described my invention, what I desire to secure by Letters Patent is:

1. In combination with blow-molding apparatus of the tangential feed, vertically rotary type wherein molded containers, joined neck to tail, are released therefrom in sequence and with means for transferring said joined containers sequentially from said apparatus to a detabbing station, a detabbing machine of the tangential feed, vertically rotary type, said machine having container grasping means for holding each joined container supplied in sequence at said station and further having tab cut-off means positioned adjacent said grasping means for removing the tabs from the held container.

2. In apparatus for producing hollow thermoplastic articles from a softened parison, the combination comprising:
    a frame having a wheel mounted thereon for rotation about a substantially horizontal axis;
    a plurality of plate members arranged circumferentially along the periphery of said wheel;
    a pair of platens mounted by each of said plate members for slidable reciprocal movement thereon along said axis;
    a mold member secured to each of said platens;
    a first track member stationarily mounted by said frame and vertically spaced from said wheel on one side thereof;
    a swingable first cam member, a horizontally movable rack member connected thereto and to one of said platens while being slidable in the other of said platens, and pinion gear means meshing with said rack member and being connected to said other of said platens, said cam member upon engagement with said track member during rotation of said wheel moving said rack member and meshing gear means to positively open and close said mold members in unison upon said parison with both of said mold members centered with respect to said parison;
    a second track member stationarily mounted by said frame and vertically spaced from said wheel on the opposite side thereof;

a fluid cylinder carried by one of said platens and a hollow needle reciprocal in said cylinder for piercing said parison, a valve communicating with said cylinder and with the interior of said needle, and a cam actuator for said valve engageable with said second track member during wheel rotation for successively and rapidly advancing said needle into said parison, injecting fluid thereinto, withdrawing said needle and exhausting said fluid from the article thus formed.

3. Apparatus of the character defined in claim 2, in which the swingable first cam member has associated therewith an overlock device for locking the mold members together at the instant of closure and unlocking the mold members during rotation of the wheel.

4. Apparatus of the character defined in claim 2, in which the second track member is circumferentially adjustable and axially variable relative to the horizontal axis.

5. Apparatus of the character defined in claim 4, in which the first track member is also circumferentially adjustable and is also axially variable relative to the horizontal axis.

6. Blow-molding apparatus comprising first, means for continuously feeding a softened parison tube of plastic material; second, means for continuously rotating a plurality of equidistantly spaced sectional molds along a vertical circular path, each mold having two mating halves and being sequentially aligned tangentially with said tube; third, means for clamping the mold halves of any mold together about a parison of said tube as said any mold becomes tangentially aligned with said tube and for separating the halves of said any clamped mold as said any clamped mold completes its swing through a predetermined arc; and a conveyor having a feed end positioned adjacent said second means at a point substantially coincident with the position at which said halves are separated and including grasping means for receiving the formed articles upon separation of said mold halves, said conveyor having a discharge end, the feed and discharge ends of said conveyor being aligned horizontally, said grasping means including finger pickup means traveling along a straight line between said feed and discharge ends.

7. Blow-molding apparatus comprising first, means for continuously feeding a softened parison tube of plastic material; second, means for continuously rotating a plurality of equidistantly spaced sectional molds along a vertical circular path, each mold having two mating halves and being sequentially aligned tangentially with said tube; third, means for clamping the mold halves of any mold together about a parison of said tube as said any mold becomes tangentially aligned with said tube and for separating the halves of said any clamped mold as said any clamped mold completes its swing through a predetermined arc; and a conveyor having a feed end positioned adjacent said second means at a point substantially coincident with the position at which said halves are separated and including grasping means for receiving the formed articles upon separation of said mold halves, said conveyor being circular and having a conveyor wheel rotated in a vertical circular path in a direction opposed to that of said second means, said grasping means including a plurality of finger pickup means secured to the periphery of said wheel at equidistantly spaced positions, said means projecting radially outward from said wheel.

8. Blow-molding apparatus comprising first, means for continuously feeding a softened parison tube of plastic material; second, means for continuously rotating a plurality of equidistantly spaced sectional molds along a vertical circular path, each mold having two mating halves and being sequentially aligned tangentially with said tube; third, means for clamping the mold halves of any mold together about a parison of said tube as said any mold becomes tangentially aligned with said tube and for separating the halves of said any clamped mold as said any clamped mold completes its swing through a predetermined arc; fourth, means for blow-molding the parison in each clamped mold to form a blown container therein as said clamped mold is rotated through a portion of said arc whereby as the halves of each mold are separated, the blown container is released therefrom; and fifth, means for removing each container in turn from the separated mold halves in a direction tangential to said circular path, said fifth means including a plurality of equidistantly spaced finger pairs, each pair grasping one of said tabs.

9. In combination with blow-molding apparatus of the tangential feed, vertically rotary type wherein molded containers, joined neck to tail, are released therefrom in sequence, a detabbing station for automatically detabbing containers sequentially supplied thereto, and means to automatically transfer said joined containers sequentially from said apparatus to said station, said detabbing station comprises a tangential feed, vertically rotary detabbing machine.

References Cited by the Examiner

UNITED STATES PATENTS

| | | | |
|---|---|---|---|
| 2,233,354 | 2/1941 | Thilenius | 18—30 |
| 2,579,390 | 12/1951 | Mills. | |
| 2,579,399 | 12/1951 | Ruekberg | 18—5 |
| 2,708,372 | 5/1955 | Korsmo | 18—30 |
| 2,750,624 | 6/1956 | Coates et al. | 18—5 |
| 2,750,625 | 6/1956 | Colombo | 18—5 |
| 2,784,452 | 3/1957 | Ruekberg et al. | 18—5 |
| 2,792,591 | 5/1957 | Cardot et al. | 18—5 |
| 2,810,160 | 10/1957 | Bottleman | 18—42 |
| 2,991,500 | 7/1961 | Hagen. | |
| 3,005,231 | 10/1961 | Pechthold | 18—5 |
| 3,015,131 | 1/1962 | Hehl | 18—30 |
| 3,019,481 | 2/1962 | Negoro | 18—5 |
| 3,020,595 | 2/1962 | Szajna | 18—42 |
| 3,025,561 | 3/1962 | Ruekberg et al. | 18—5 |
| 3,040,376 | 6/1962 | Elphee | 18—5 |
| 3,044,112 | 7/1962 | Perry | 18—5 |
| 3,069,722 | 12/1962 | Kato | 18—5 |

FOREIGN PATENTS

| | | |
|---|---|---|
| 61,855 | 12/1954 | France. |
| 1,244,287 | 9/1960 | France. |

WILLIAM J. STEPHENSON, *Primary Examiner.*

MICHAEL V. BRINDISI, *Examiner.*